Patented Apr. 26, 1938

2,115,066

UNITED STATES PATENT OFFICE 2,115,066

NEW COMPOSITIONS OF MATTER

William F. Filbert, Woodbury, N. J., assignor to E. I. du Pont de Nemours & Company, Wilmington, Del., a corporation of Delaware No Drawing. Application January 28, 1936, Serial No. 61,171

12 Claims. (Cl. 52—4)

The present invention relates to processes for the preparation of new compositions of matter, and more particularly to new compositions of matter derived from the nitration products of alpha-2,4-dinitroanilino-isobutyric acid. The invention also relates to new explosive compounds, and in particular to new ignition compounds for use in electric blasting initiators.

It is known that electric blasting initiators ordinarily consist of cylindrical shells or capsules containing a base charge of explosive material, an ignition composition superposed thereon, and means for electrically firing said ignition composition.

It is desirable that the ignition compositions should possess certain optimum properties such as ease of ignition, a large heat of reaction, and a uniform rate of ignition. In certain specific types of initiators, other features are to be considered. For instance, in the "fast" electric blasting caps intended for use in seismographic determinations, a very rapid rate of ignition is necessary. The interval between application of the current and the firing of the ignition mixture should be very small.

The object of the present invention is the preparation of new compositions of matter. Another object is a new composition of matter derived from the nitration products of alpha-2,4-dinitroanilino-isobutyric acid. An additional object is a new explosive composition. A further object is an ignition composition suitable for use in electric blasting initiators. Other objects will be apparent from the detailed description of my invention which follows:

I have found that the foregoing objects may be accomplished by the nitration of alpha-2,4-dinitroanilino-isobutyric acid, and the preparation of the salts, and especially the basic salts, which the heavy metals form with the products of said nitration.

In particular, I have discovered that alpha-2,4-dinitroanilino-isobutyric acid may be nitrated with a mixed sulfuric and nitric acid to form a product from whch a new compound may be isolated in crystalline form. These crystals melted at 152° to 153° C. with complete decomposition. The new substance is thought to be of the following name and structure:

Alpha-trinitrophenyl-nitramino-isobutyric acid or alpha (N-trinitrophenyl-N-nitro) amino-isobutyric acid.

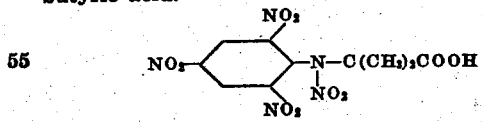

Further details of the process of preparation are disclosed in Example I, which follows:

Example I 19.5 grams of alpha-2,4-dinitroanilino-isobutyric acid was added to 100 cc. of a mixture of 50% sulfuric acid and 50% nitric acid, accompanied by stirring, the temperature being maintained below 0° C. The mixture was then warmed to 30° C. and allowed to stand 12 hours at that temperature, followed by dilution with water under a controlled temperature of less than 25° C. Filtration isolated 21.19 grams of pale cream colored crystals of imperfect shape, which melted and decomposed at 153° C. This new acid possessed a neutralization equivalent of 175.6 and was found to contain 19.15% nitrogen. The new substance displays a strong positive reaction to the Thiele test for the nitramine group.

Additional new compounds may be prepared by the reaction of this acid to form metallic salts and especially salts of the heavy metals, such as lead, copper, cadmium, silver, mercury, and the like, in the presence of alkali. For instance, when the new acid was treated with alkali and lead nitrate, as shown in Example II (infra), a new compound was isolated in the form of yellow crystals. This substance was apparently a basic lead salt, the basic lead group having entered in two positions, a fact which seemed to indicate that the new acid was dibasic in the presence of alkali. The exact structure of the supposed basic lead derivative was not determined, but it was probably in one of the two forms shown herein:

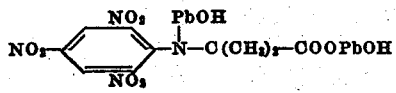

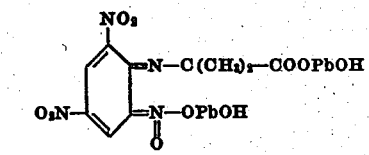

Basic lead alpha-trinitrophenyl-basic lead-amino-isobutyrate. Either seems possible in view of the fact that nitramines are known to be attacked by alkali with loss of the —NO₂ group.

Example II

A solution of 4.65 grams of the new acid in 150 cc. of water containing 53 cc. of a normal solution of sodium hydroxide was prepared and found to be wine red in color. This solution was added slowly to a well stirred solution of 8.75 grams of lead nitrate in 200 cc. of water, at a temperature of 35 to 37° C. A precipitate of very fine, yellow, elongated prisms was formed. The total yield was 8.0 grams and contained 54.5% lead.

I have discovered further that this lead or basic lead reaction product of the new acid exhibited properties which rendered it desirable for use as an explosive, and especially as an ignition agent in electric blasting initiators. In particular, the new explosive was comparable to lead styphnate as an ignition agent adaptable for use in fast electric blasting caps of the type used in seismographic investigations. In such work, it is desirable that there should be no appreciable time lag between the application of the current and the firing of the cap. It was determined by means of an oscillograph that caps containing the new basic lead explosive as an ignition agent exhibited a time lag of .004 second when fired with a current of 1 ampere, compared with .006 second for lead styphnate under the same conditions. In both cases the time lag was greatly diminished at higher firing currents. Like lead styphnate, the new basic lead explosive was extremely sensitive to static electricity and fairly sensitive to shock and friction. The new basic lead explosive offers a marked advantage over lead styphnate, however, in respect to ease of ignition. The minimum possible firing current for lead styphnate is .38 amp., while the new explosive may be fired with a current of .32 amp. as a loose charge.

It is to be understood that the scope of the invention is not to be limited by the details given in the examples or by the names assigned to the new compounds. I have discovered that new compositions of matter may be prepared by the foregoing nitration and other processes, regardless of the particular structure which may be attributed to these compositions. I have further discovered the adaptability of some of these new compounds for use as explosives. Although I prefer to use the new so-called basic heavy metallic salts as ignition agents, they may be widely used in explosive compositions as detonators, primers, and the like, and wherever their properties render them suitable. For instance, these compounds may be gelatinized with nitrostarch and in this form be incorporated in concave plug mixtures. Although I prefer the lead salts, similar reactions cause the formation of corresponding salts of the other heavy metals, such as copper, zinc, mercury, silver, and the like.

Furthermore, my invention is not limited to compounds containing the butyric acid radical, but is intended to cover all compounds having this formula

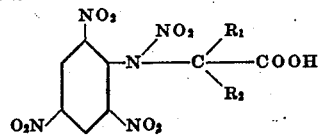

in which $R_1$ and $R_2$ are taken from a group of atoms and radicals comprising hydrogen, alkyl groups, a cyano radical, a carboxylic ester grouping, and a halogen, as well as salts of the foregoing acids.

Although I have described my invention in detail and have therefore utilized certain specific terms and language therein, it is to be understood that the present disclosure is illustrative rather than restrictive and that changes and modifications may be resorted to without departing from the spirit or scope of the claims appended hereto.

I claim:

1. As a new composition of matter, a compound having the formula

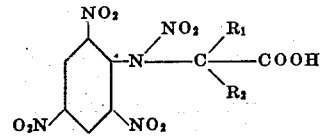

in which $R_1$ and $R_2$ are taken from a group of atoms and radicals consisting of hydrogen, alkyl radicals, a cyano radical, a carboxylic ester grouping and a halogen.

2. As a new composition of matter, a salt of the acid of claim 1.

3. As a new composition of matter, a compound selected from the group consisting of alpha-trinitrophenyl-nitramino-isobutyric acid, and the salt derivatives of said acid.

4. As a new composition of matter, a basic lead salt of alpha-trinitrophenyl-nitramino-isobutyric acid.

5. As a new composition of matter, basic lead alpha-trinitrophenyl-N-basic lead-amino-isobutyrate.

6. An ignition composition comprising a basic heavy metallic salt derivative of alpha-trinitrophenyl-nitramino-isobutyric acid.

7. An ignition composition comprising basic lead alpha-trinitrophenyl-N-basic lead-amino-isobutyrate.

8. An ignition composition in an electric blasting initiator comprising a basic heavy metallic salt derivative of alpha-trinitrophenyl-nitramino-isobutyric acid.

9. An ignition composition in an electric blasting initiator, comprising basic lead alpha-trinitrophenyl-basic lead-amino-isobutyrate.

10. As a new composition of matter, the basic lead salt derivative of the nitration product of alpha-2,4-dinitranilino-isobutyric acid.

11. The process of preparing alpha-trinitrophenyl-nitramino-isobutyric acid, which comprises the nitration of alpha-2,4-dinitranilino-isobutyric acid.

12. An ignition composition in an electric blasting initiator comprising the basic lead salt derivative of the nitration product of alpha-2-4-dinitranilino-isobutyric acid.

WILLIAM F. FILBERT.